(12) United States Patent
Medina et al.

(10) Patent No.: US 8,789,093 B2
(45) Date of Patent: Jul. 22, 2014

(54) SYSTEM AND METHOD FOR MANAGING A SURVEILLANCE SYSTEM

(75) Inventors: Douglas Medina, Grain Valley, MO (US); Jon Heath, Lee's Summit, MO (US); Ronald Jones, Stilwell, KS (US)

(73) Assignee: AT&T Intellectual Property I, LP, Atlanta, GA (US)

(*) Notice: Subject to any disclaimer, the term of this patent is extended or adjusted under 35 U.S.C. 154(b) by 367 days.

(21) Appl. No.: 12/787,357

(22) Filed: May 25, 2010

(65) Prior Publication Data

US 2011/0296459 A1 Dec. 1, 2011

(51) Int. Cl.
*H04N 5/232* (2006.01)
*H04N 21/482* (2011.01)
*H04N 7/18* (2006.01)

(52) U.S. Cl.
CPC .......... *H04N 5/232* (2013.01); *H04N 21/482* (2013.01); *H04N 7/181* (2013.01)
USPC ............ 725/37; 725/38; 725/139; 348/143; 348/207.1; 348/211.8; 348/211.13

(58) Field of Classification Search
CPC ...... H04N 5/232; H04N 7/181; H04N 21/482
USPC ............ 348/208.15, 208.16, 207.11, 211.2, 348/211.3, 211.99, 143, 207.1, 211.8, 348/211.13; 725/37, 38, 139
See application file for complete search history.

(56) References Cited

U.S. PATENT DOCUMENTS

| | | | |
|---|---|---|---|
| 5,805,806 A * | 9/1998 | McArthur | 709/250 |
| 6,778,085 B2 * | 8/2004 | Faulkner et al. | 340/541 |
| 7,292,723 B2 * | 11/2007 | Tedesco et al. | 382/159 |
| 7,323,980 B2 * | 1/2008 | Faulkner et al. | 340/521 |
| 7,502,546 B2 * | 3/2009 | Elberbaum | 386/201 |
| 7,843,490 B2 * | 11/2010 | Wixson et al. | 348/143 |
| 7,876,786 B2 * | 1/2011 | Bahl et al. | 370/478 |
| 8,073,931 B2 * | 12/2011 | Dawes et al. | 709/219 |
| 8,081,817 B2 * | 12/2011 | Tedesco et al. | 382/159 |
| 8,121,223 B2 * | 2/2012 | Mandal et al. | 375/324 |
| 8,122,131 B2 * | 2/2012 | Baum et al. | 709/226 |
| 8,166,098 B1 * | 4/2012 | Reardon | 709/202 |
| 8,185,599 B2 * | 5/2012 | Kansal et al. | 709/211 |
| 8,392,947 B2 * | 3/2013 | Grannan et al. | 725/50 |
| 8,413,204 B2 * | 4/2013 | White et al. | 725/133 |
| 2004/0075561 A1 * | 4/2004 | Lerg et al. | 340/573.1 |
| 2004/0162137 A1 * | 8/2004 | Eliott | 463/29 |
| 2005/0041736 A1 * | 2/2005 | Butler-Smith et al. | 375/240.01 |
| 2005/0066371 A1 * | 3/2005 | Lu | 725/105 |
| 2005/0068175 A1 * | 3/2005 | Faulkner et al. | 340/541 |
| 2006/0028556 A1 * | 2/2006 | Bunn et al. | 348/211.99 |

(Continued)

*Primary Examiner* — Nasser Goodarzi
*Assistant Examiner* — Michael B Pierorazio
(74) *Attorney, Agent, or Firm* — Guntin & Gust, PLC; Jay H. Anderson

(57) ABSTRACT

A system that incorporates teachings of the present disclosure may include, for example, a network device including a controller programmed to receive security video content associated with a premises where the security video content has been captured by one or more cameras located within or in proximity to the premises and where the premises have one or more Digital Video Recorders (DVRs), and transmit the security video content to the DVR for forwarding to a communication device that is remote from the premises, where the security video content is wirelessly transmitted over a wireless television (TV) channel dynamically selected from available wireless TV channels associated with the premises. Other embodiments are disclosed.

20 Claims, 6 Drawing Sheets

(56) References Cited

U.S. PATENT DOCUMENTS

| | | | | |
|---|---|---|---|---|
| 2006/0140584 | A1* | 6/2006 | Ellis et al. | 386/83 |
| 2007/0070213 | A1* | 3/2007 | Tedesco et al. | 348/222.1 |
| 2007/0138275 | A1* | 6/2007 | Hall | 235/400 |
| 2008/0022322 | A1* | 1/2008 | Grannan et al. | 725/78 |
| 2008/0130519 | A1* | 6/2008 | Bahl et al. | 370/254 |
| 2008/0240301 | A1* | 10/2008 | Mandal et al. | 375/340 |
| 2008/0247670 | A1* | 10/2008 | Tam et al. | 382/298 |
| 2008/0293353 | A1* | 11/2008 | Mody et al. | 455/1 |
| 2009/0066534 | A1* | 3/2009 | Sivakkolundhu | 340/825.52 |
| 2009/0070436 | A1* | 3/2009 | Dawes et al. | 709/219 |
| 2009/0076969 | A1* | 3/2009 | Sparks | 705/80 |
| 2009/0138600 | A1* | 5/2009 | Baum et al. | 709/226 |
| 2009/0144791 | A1* | 6/2009 | Huffman et al. | 725/114 |
| 2009/0196180 | A1* | 8/2009 | Bahl et al. | 370/235 |
| 2009/0204989 | A1* | 8/2009 | White et al. | 725/37 |
| 2009/0217321 | A1* | 8/2009 | White | 725/37 |
| 2009/0231428 | A1* | 9/2009 | Suzuki | 348/143 |
| 2009/0249428 | A1* | 10/2009 | White et al. | 725/133 |
| 2010/0033569 | A1* | 2/2010 | Kim et al. | 348/143 |
| 2010/0073483 | A1* | 3/2010 | Squillante et al. | 348/159 |
| 2010/0110195 | A1* | 5/2010 | Mcintosh | 348/157 |
| 2010/0142428 | A1* | 6/2010 | Song | 370/312 |
| 2010/0151904 | A1* | 6/2010 | Karaoguz et al. | 455/556.2 |
| 2010/0195590 | A1* | 8/2010 | Park | 370/329 |
| 2010/0296498 | A1* | 11/2010 | Karaoguz et al. | 370/338 |
| 2010/0311342 | A1* | 12/2010 | Arbel | 455/62 |
| 2010/0318701 | A1* | 12/2010 | Srinivasan et al. | 710/104 |
| 2010/0331026 | A1* | 12/2010 | Hottinen et al. | 455/501 |
| 2011/0043710 | A1* | 2/2011 | Samarasooriya et al. | 348/735 |
| 2011/0263209 | A1* | 10/2011 | Kasslin et al. | 455/67.11 |
| 2011/0280249 | A1* | 11/2011 | Shrum et al. | 370/401 |
| 2012/0066608 | A1* | 3/2012 | Sundermeyer et al. | 715/738 |
| 2012/0066632 | A1* | 3/2012 | Sundermeyer et al. | 715/771 |
| 2012/0098969 | A1* | 4/2012 | Wengrovitz et al. | 348/159 |
| 2012/0136865 | A1* | 5/2012 | Blom et al. | 707/739 |
| 2013/0179926 | A1* | 7/2013 | White et al. | 725/59 |

* cited by examiner

400

600

SYSTEM AND METHOD FOR MANAGING A SURVEILLANCE SYSTEM

FIELD OF THE DISCLOSURE

The present disclosure relates generally to communication systems and more specifically to a method and apparatus for managing a surveillance system.

BACKGROUND

Interactive TV networks provide a multitude of services including broadcast programming and video-on-demand. These networks reach out to users in various environments including single family residences, multi-dwelling apartments and commercial facilities. The types of service and the ability to provide those services is often dependent on the particular environment of the potential users.

DETAILED DESCRIPTION

One embodiment of the present disclosure can entail a network device comprising a controller programmed to receive security video content associated with a premises where the security video content has been captured by one or more cameras located within or in proximity to the premises and where the premises has one or more Digital Video Recorders (DVRs), and transmit the security video content to the DVR for forwarding to a communication device that is remote from the premises, where the security video content is wirelessly transmitted over a wireless television (TV) channel dynamically selected from available wireless TV channels associated with the premises.

Another embodiment of the present disclosure can entail a non-transitory computer readable storage medium comprising computer instructions to receive a broadcast of security video content at a Digital Video Recorder (DVR) where the security video content is associated with a premises having a plurality of dwelling units where the security video content has been captured by one or more cameras located within or in proximity to the premises where the broadcast of the security video content has been performed at least in part wirelessly over a wireless television (TV) channel dynamically selected from available wireless TV channels associated with the premises, and transmit the security video content from the DVR to a communication device that is remote from the premises.

Yet another embodiment of the present disclosure can entail a method comprising receiving security video content associated with a premises having a plurality of display devices where the security video content has been captured by one or more cameras located within or in proximity to the premises, and broadcasting the security video content to the display devices, where the security video content is wirelessly broadcast over a wireless television (TV) channel dynamically selected from available wireless TV channels associated with the premises, and where the broadcast of the security video content is performed independently of interactive TV services provided to the display devices.

Figure 1:
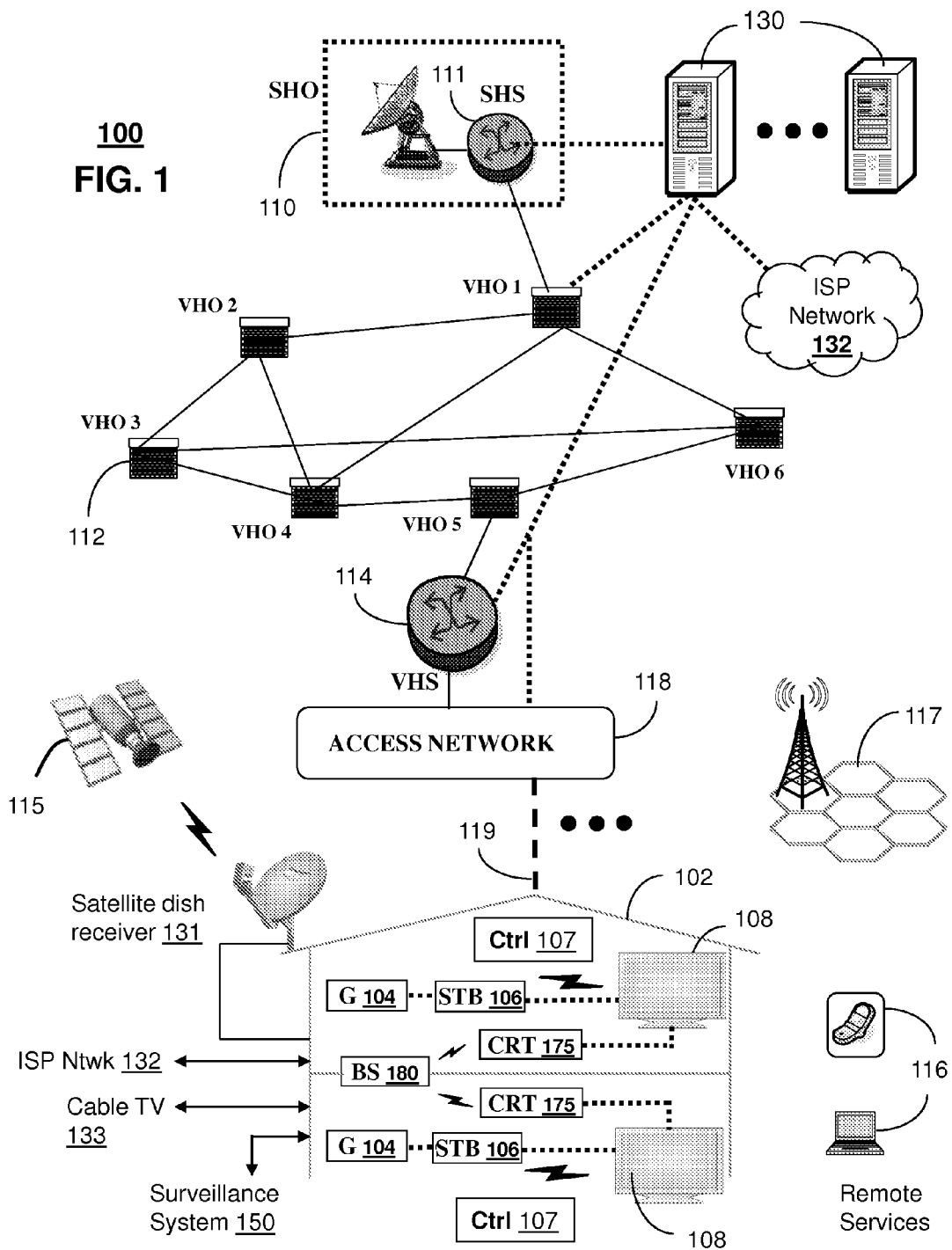
FIGS. 1 and 4 depict illustrative embodiments of communication systems that provide media and surveillance services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The building 102 can be various types including multi-dwelling units which house a plurality of different subscribers. The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of relaying and/or receiving media content to ISP network 132 or to other networks.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the building 102 can have a surveillance system 150 including various security devices such as security cameras, motion detectors, automated door locks, intercoms, processors and so forth. Each of the units and/or subscribers within the building 102 can have a cognitive radio transceiver (CRT) 175 that can wirelessly receive signals from the surveillance system 150. The signals can be video media captured by security cameras throughout the building (such as at the front door, the pool, and so forth).

In another embodiment, a Base Station (BS) 180 can be used for facilitating the transmission of the signals between the BS 180 and each CRT 175. For example, where the building 102 is a multi-floor, multi-dwelling building, a BS 180 can be positioned on each floor of the building to receive the signals from the surveillance system 150 and re-transmit the signals to each CRT 175 on that particular floor. The BS 180 can receive the signals from the surveillance system 150 wirelessly (such as using cognitive radio, 802.11 protocol, 802.22 protocol and so forth) and/or through a hardwire connection. The BS 180 can then re-transmit the signals to the CRT's 175 wirelessly, such as using cognitive radio or 802.22 protocol. In another embodiment, the surveillance system 150, the BS 180 and the CRT's 175 can perform two-way communication, including allowing the CRT's to provide spectrum information to the surveillance system to facilitate selection of a transmission channel under the cognitive radio or 802.22 protocols.

It follows from the above illustrations that the present disclosure can apply to any present or future interactive over-the-air or landline media content services.

Figure 2:
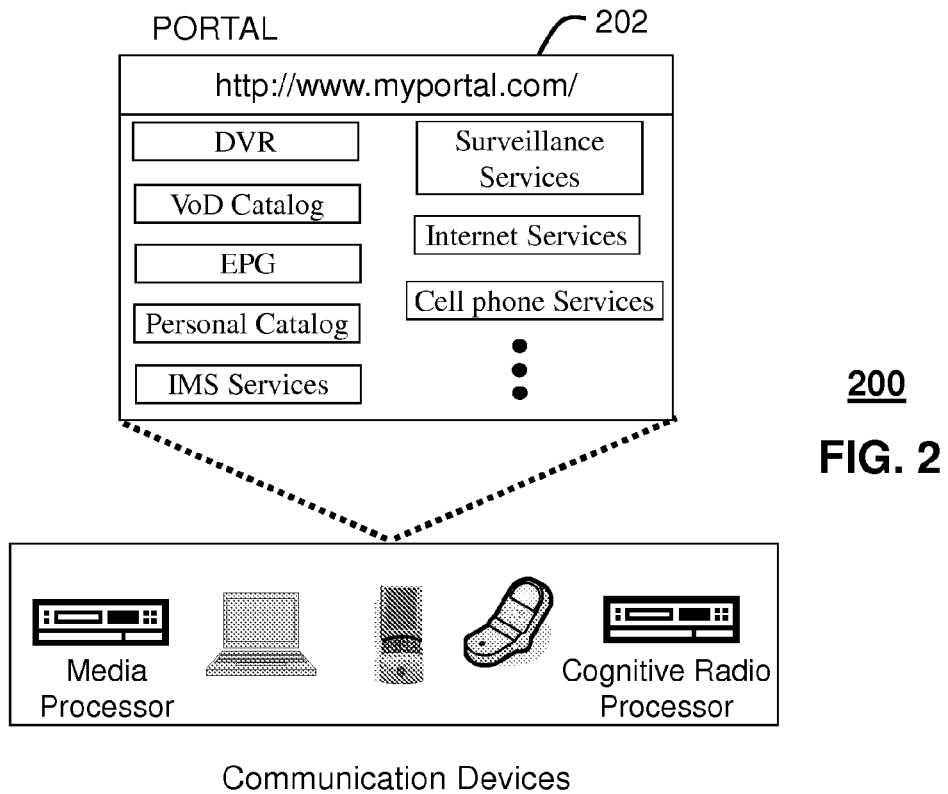
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services, provisioning Internet services, provisioning cellular phone services, provisioning surveillance services and so on. For example, a user can utilize the portal to configure the cognitive radio processor for receiving video security footage as it is captured by security cameras in the building. In another embodiment, the captured video can be forwarded to other communication devices and/or entities, such as a mobile telephone of the user or the police.

Figure 3:
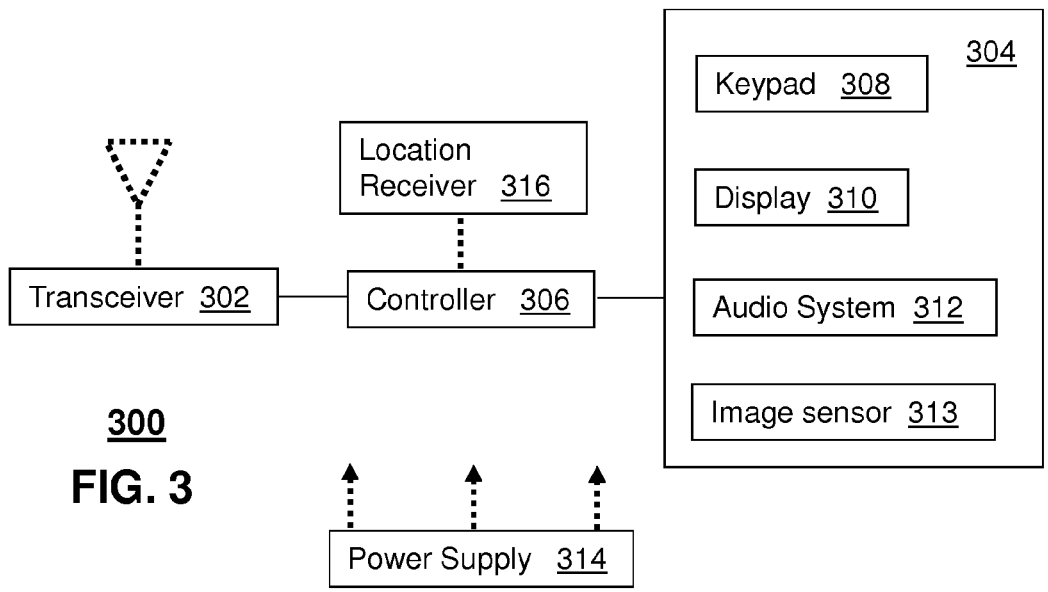
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player.

Figure 4:
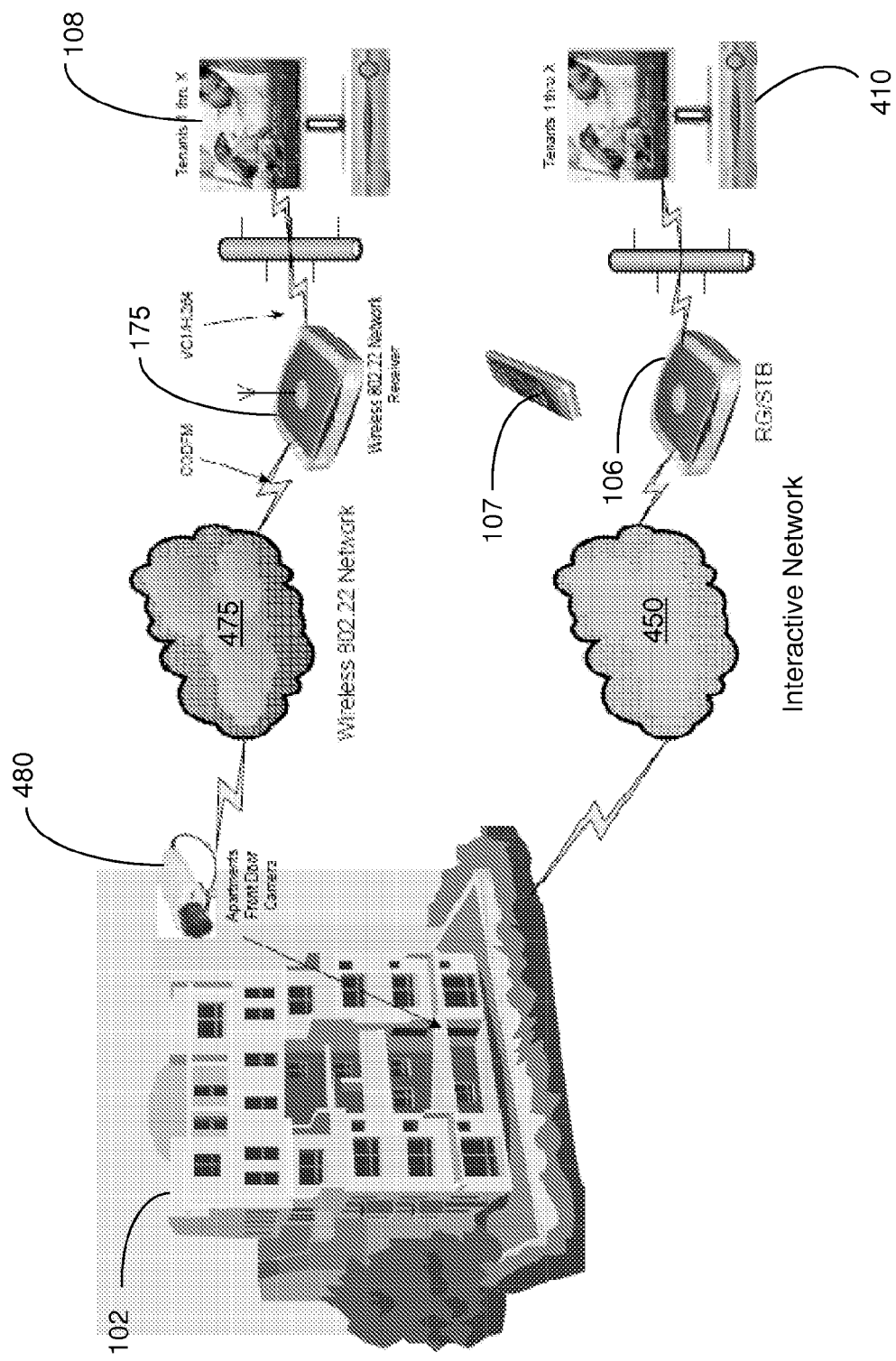

FIG. 4 depicts an illustrative embodiment of a system 400 for providing surveillance services to a plurality of users, the system 400 being operable in portions of the communications system of FIG. 1. The system 400 can include a premises or building 102, which has a plurality of media display devices 108 connected with STBs 106 and CRT's 175. The building 102 can be a multi-dwelling, multi-floor building, although other premises configurations are also contemplated. The media devices 108 can present media content and surveillance data, including security video content. The media content provided via a content network 450 can include video, audio, still images, text, other media content, and/or combinations thereof. Media content and iTV services provided by the content network 450 can include IPTV, interactive cable television, and/or interactive satellite television. The surveillance services can be provided using the wireless network 475 with the CRT 175 providing the data to the display device 108. One or more video cameras 480, which are strategically positioned with respect to the building 102, can feed security video content to the network 475.

In one embodiment, the security video content can be provided to a DVR 410 that stores the content or a portion thereof. The security video content can be provided from the DVR 410 to other devices and/or entities, including those that are remote from the premises. For example, the security video content can be selectively forwarded to one or more other communication devices associated with the user. For instance, security video content can be transmitted to a cellular phone of the user when the user is away from the premises. In another embodiment, the security video content can be transmitted to a security company or the police.

The transmission of the security video content to another device or entity can be selectively performed. In one embodiment, transmission of the security video content to another entity or device can be associated with detection of an undesired condition associated with the premises. For instance, video recognition can be applied to the security video content to detect the undesired condition, such as an unauthorized individual in a particular location. In another embodiment, the video recognition can be used to determine unauthorized behavior or a probability of unauthorized activity, such as objects in an area being moved (furniture in the lobby being taken). The video recognition can be performed by various devices, including a server located at the premises, as well as a remote back-end server of the ISP. The particular video or image recognition technique employed can also vary.

In one embodiment, the video recognition can be applied to the movement of individuals to determine the probability of the behavior being unauthorized such as rapid movement through a particular area (e.g., running, violent motions, and so forth). These video recognition techniques can be employed to determine if the security video content should be transmitted to another entity or device, including a security company. In another embodiment, the security video recognition can be used to flag a portion of the video content so that it can be reviewed for an undesired condition associated with the premises. Other techniques can be used to selectively forward the security video content to another device or entity, including motion detectors that monitor the area associated with the video content.

The content network 450 can be operably coupled to a gateway and can deliver the media content to the gateway, which can serve as an interface between the content network 450 and the other components/devices of a user's media system. The gateway can relay the media content to STB 106, which can have an associated remote control 107. The remote control 107 can be utilized to switch channels, adjust volume, record media content, interact with media content, and/or perform other functions. The remote control 107 can also be used to interact with the surveillance services. For instance, the remote control 107 can be used for switching between camera views, forwarding captured video content (such as to the police or to other residents of the building 102) and for configuring the surveillance account.

Figure 5:
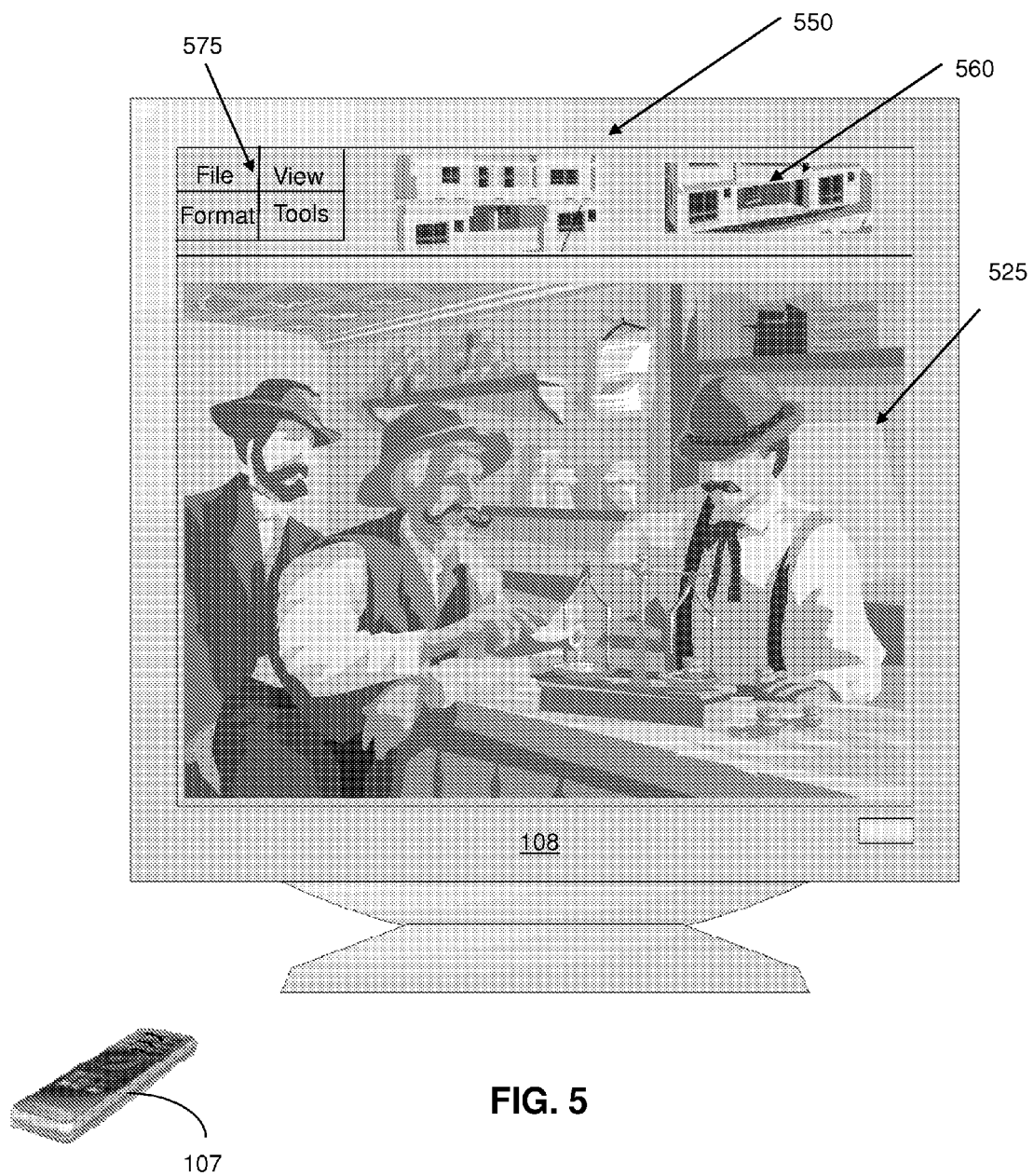
FIG. 5 depicts an illustrative embodiment of a graphical user interface for the surveillance system of FIGS. 1 and 4.

As shown in FIG. 5, the display device 108 can present the security video content in a security GUI 550. The video content 560 can be presented in one or more views (such as three views from three cameras as depicted in FIG. 5). The security GUI 550 can include a toolbar 575 for interactive use of the surveillance services, including selection of the cameras, selection of the video format, recording of the security video content, transmission of the video content to other entities or devices and so forth. The remote control 107 can be used to interact with the surveillance services and/or can be used for interacting with the media services, such as through the STB. The display device 108 can present media content 525 while allowing for selective presentation of the security video content within the GUI 550. In one embodiment, the user can select a desired presentation format, such as presenting an indicator (visual and/or audio) when an individual and/or undesired condition is believed to be present in the video content that has just been captured. Based on the indicator, the user can then choose whether GUI 550 should appear along a portion of the display screen. Other display techniques are also contemplated by the present disclosure, including using a dedicated channel for presenting the security video content.

Figure 6:
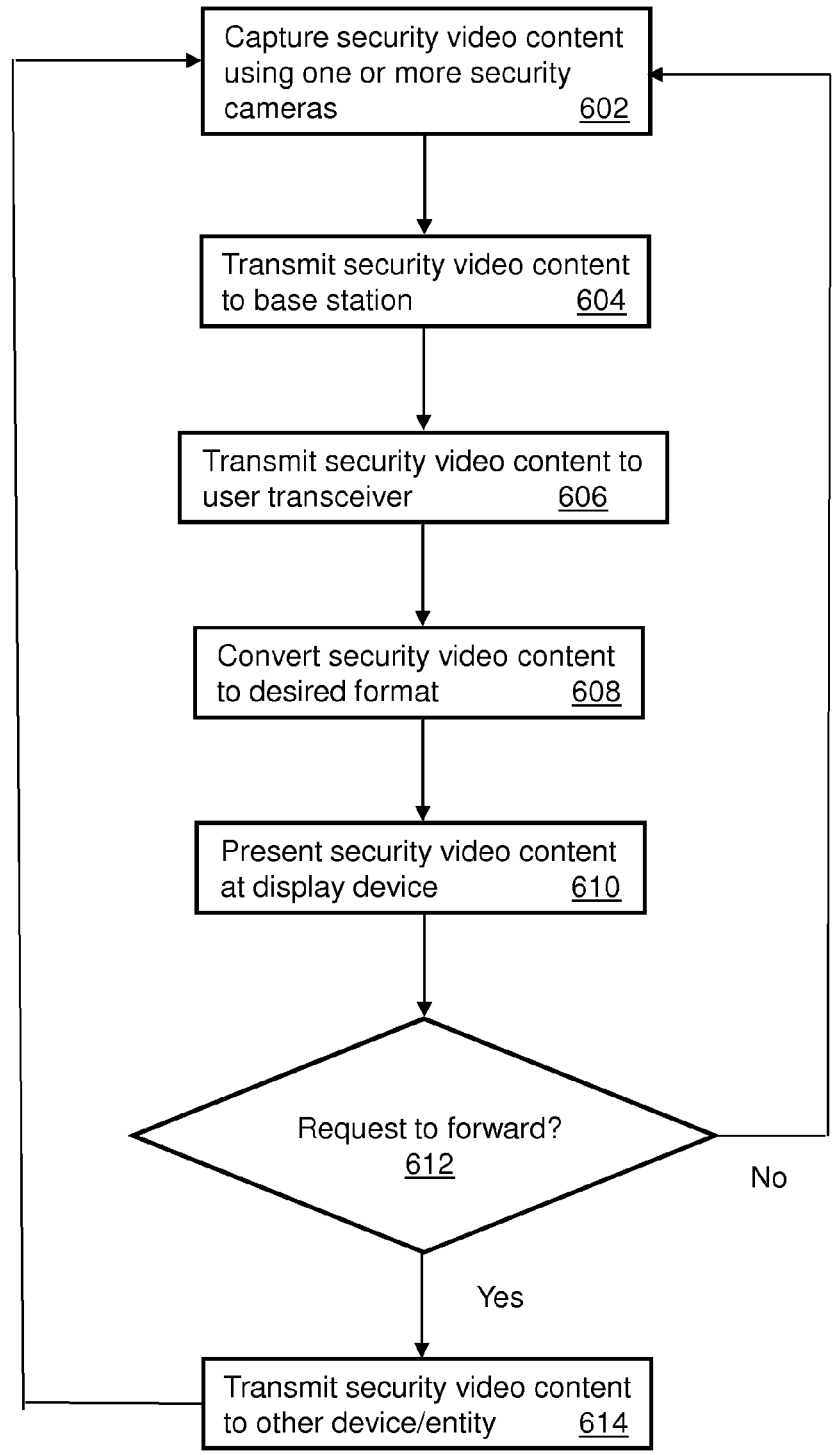
FIG. 6 depicts an illustrative embodiment of a method operating in portions of the communications systems of FIGS. 1 and 4.

FIG. 6 depicts an illustrative method 600 that operates in portions of the communication systems of FIGS. 1 and 4. Method 600 can begin with step 602 in which security information is captured by surveillance devices strategically positioned with respect to a premises. The security information can include video or still images captured by cameras located in various areas, such as at points of entry with respect to the premises. Other security information can also be captured, including motion detection.

In step 604, the captured video content can be provided to base stations throughout the building, such as located on each floor. The content can be transmitted wirelessly to the base stations, such as through use of an 802.11 compatible system or WiFi. Other wireless transmission can also be utilized to deliver the captured video content from the cameras to the base stations, including cognitive radio techniques including 802.22 compatible systems. In another embodiment, the cameras can deliver the captured video content to the base stations via a hardwire link. The present disclosure contemplates the use of a combination of wireless and wireline delivery of the content to the base stations.

In step 606, the security video content can be transmitted from the base stations to each of or a select portion of the user transceivers, such as through multicast. The user transceivers can be located in each of the apartment units in the building and wireless transmission using cognitive radio techniques can be employed. For example, the base stations can employ the 802.22 standard for multicast wireless transmission, where the security video content is transmitted over unused channels in the TV spectrum. In one embodiment, this spectrum can be between 54 and 862 MHz in the UHF and VHF channels. The present disclosure also contemplates use of the guard bands for transmission.

Implementation of the cognitive radio transmission, including the 802.22 techniques, can be performed in a number of different ways. For example, monitoring of the available white space in the TV spectrum can be performed, such as by the transceiver, and then can be forwarded to the base stations so that the video content is transmitted in a channel with minimum or no interference. In another embodiment, a separate monitoring unit, such as a server located at the building, can be used for determining the appropriate channel for wirelessly broadcasting the security video content. The present disclosure also contemplates the channel determination being made remotely from the building. The particular technique can vary. One such technique is described in U.S. Patent Publication No. 2009/0144791, the disclosure of which is hereby incorporated by reference.

In step 608, the transceiver can convert the format of the security video content for display on the media display device. In one embodiment, the received content can be in CODFM, VC1 or H264 and can be converted to composite video. In another embodiment, the particular format that the content is converted to can be selected based on attributes of the display device. These attributes can be detected by the transceiver and/or pre-selected by the user when configuring the transceiver. In another embodiment, these attributes can be determined based on a user profile associated with the display device that is accessed by the transceiver. Once converted, the security video content can be presented at the display device as in step 610. The security GUI 550, which includes the captured video content, can be displayed on the media device 108, which can be a television, a computer, a cellular device, or other device capable of displaying a GUI. In one embodiment, a user can utilize a command in the "View" menu to zoom in on a particular location, which implements a zoom function on the camera. Camera motion can also be controlled using this procedure. In another embodiment, camera control can be subject to administrative privileges, such as only allowing floor captains to operate the cameras.

In step 612, it can be determined whether there is a request to forward the security video content to another entity and/or device. The request can be based on user interaction with the transceiver at the time of presentation of the security video content and/or can be based on pre-determined criteria for forwarding the content. For instance, security video content that is being presented in real-time on the display device can be forward in near real-time based on an input from a user at the time of presentation. As another example, security video content, which has been recorded on the user's DVR can be forwarded at the time of viewing of the recorded content based on an input from the user at the time of viewing. The present disclosure contemplates the transceiver and/or the display device plugging into a USB port on the STB so that the captured security video content can be provided to the DVR for selective recording.

As yet another example, rules can be established for forwarding of the security video content to the other entity and/or device. For instance, a user can forward all security video content to the user's cellular phone for remotely viewing when the user is not at the premises. A user can also forward all security video content to another communication device when the user knows that he or she will be in proximity to this other communication device (such as a hotel when on vacation). In another embodiment, the user can remotely access the security video content stored on the DVR using the portal or other internet connection.

In step 614, the security video content can be transmitted to the designated other entity (such as the police or a security company) or other device. In one embodiment, the transceiver can provide the DVR with multiple formats of the security video content so that the content is ready for presentation at the display device as well as ready for transmission to one or more other communication devices and/or entities. The transmission of the content to the other communication devices and/or other entities can be performed using various modes of communication. For instance, the STB can transmit the content over the internet to the target. Other paths and protocols are also contemplated, including transmission using the 802.22 and/or IPTV networks to reach the targets. In another embodiment, the user can share the video content with other users in different units of the building.

In one embodiment, the presentation of real-time security video content at a display device can be performed independently of any interactive TV system connected with the display device. In another embodiment, the delivery of the real-time security video content to a DVR can be performed independently of any interactive TV system, such that the delivery of the security content does not require use of the iTV interfacing network devices, such as the residential gateway. The display device can simultaneously receive the security video content from the cognitive radio transceiver and receive the media content from the interactive TV system, such as an IPTV network.

Upon reviewing the aforementioned embodiments, it would be evident to an artisan with ordinary skill in the art that said embodiments can be modified, reduced, or enhanced without departing from the scope and spirit of the claims described below. For example, forwarding of the captured security video content can be based on presence information associated with the user's communication devices. Various techniques can be implemented for determining a probability that a user will be available at a particular communication device, such as monitoring movement or activity of a communication device.

In one embodiment, the surveillance system can be linked with an E911 system through use of the DVR. The security video content and/or a message associated with an undesired condition of the premises can be transmitted using the E911 system through such a link. The exemplary embodiments can be used for retro-fitting existing surveillance systems so that security video content can be delivered to the individual units in a building without the need to re-wire a building.

In yet another embodiment, the cognitive radio transceivers can be utilized for establishing audio and/or video conferencing between individual units in the building (and/or between a unit and the front office of the building). For instance, audio and/or video conferencing between individual units can be established using signals transmitted over the 802.22 network.

Other suitable modifications can be applied to the present disclosure without departing from the scope of the claims below. Accordingly, the reader is directed to the claims section for a fuller understanding of the breadth and scope of the present disclosure.

Figure 7:
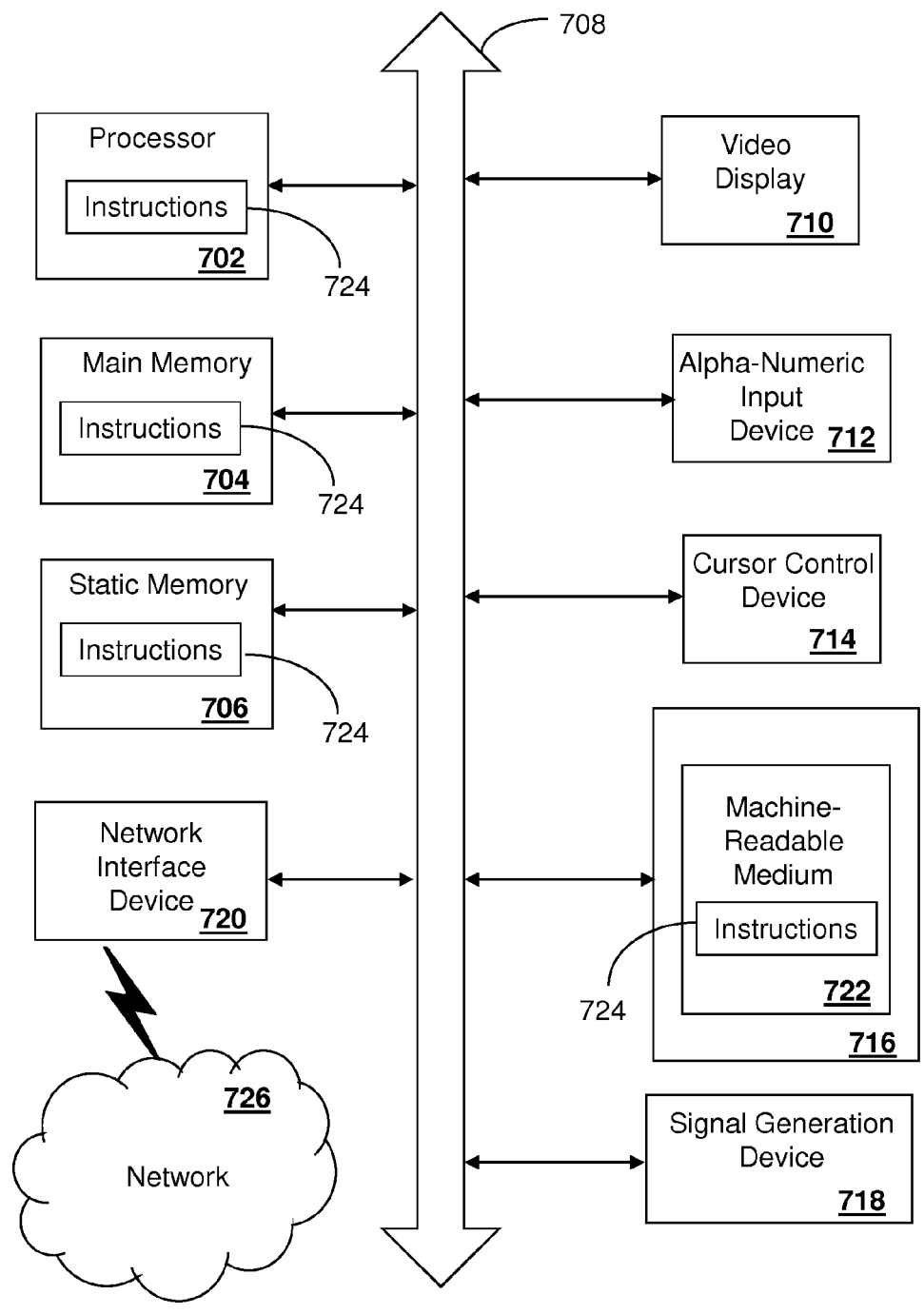
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network device comprising:
   a memory to store computer instructions; and
   a controller coupled with the memory, wherein the controller, responsive to executing the computer instructions, performs operations comprising:
      receiving security video content associated with a premises, the security video content having been captured by a camera located within or in proximity to the premises, wherein the security video content is provided to a surveillance network having subscribers, wherein transceivers located at the premises are coupled with a group of digital video recorders, each subscriber at the premises having a transceiver and a digital video recorder;
      receiving television spectrum data from a target transceiver from among the transceivers, wherein the television spectrum data is based on monitoring at the premises by the target transceiver of available television spectrum space comprising unused channels to determine a channel for wirelessly transmitting the security video content, where the channel is determined by the target transceiver to have reduced interference with respect to other channels;
      transmitting the security video content to the target transceiver among the transceivers for storage at a digital video recorder from among the group of digital video recorders, wherein the transmitting of the security video content causes the digital video recorder to forward the security video content to a communication device that is remote from the premises, wherein the security video content is wirelessly transmitted over a wireless television channel dynamically selected by the controller from available wireless television channels associated with the premises according to the television spectrum data, wherein the communication device is associated with an entity other than the subscribers at the premises;
      presenting the security video content at a display device associated with the digital video recorder, wherein the digital video recorder is provided with the security video content by the target transceiver in a first format for presentation at the display device and in a second format for forwarding to the communication device; and
      delivering media content to the digital video recorder for presentation at the display device simultaneously with the security video content, wherein the media content is provided by a content network distinct from the surveillance network.

2. The device of claim 1, wherein the transmitting of the security video content to the digital video recorder is performed independent of delivery of media content to the digital video recorder from an interactive television network.

3. The device of claim 2, wherein the controller is programmed to generate a graphical user interface for presentation on the display device associated with the digital video recorder, the graphical user interface occupying a portion of a screen of the display device and allowing presentation of the media content on another portion of the screen.

4. The device of claim 3, wherein the graphical user interface comprises a toolbar that allows for controlling of the camera.

5. The device of claim 1, wherein the security video content is forwarded to another communication device, wherein the other communication device is a mobile device associated with a user of the digital video recorder, and wherein the mobile device is selected based on presence information.

6. The device of claim 1, wherein the transmitting of the security video content is according to the 802.22 standard.

7. A tangible computer readable storage device comprising instructions which, responsive to being executed by a processor, cause the processor to perform operations comprising:
      receiving a broadcast of security video content from a base station, the security video content being associated with a premises having a plurality of dwelling units each having a transceiver device and a digital video recorder, the broadcast being received at the digital video recorder of a dwelling unit, the security video content having been captured by a camera located within or in proximity to the premises, the broadcast of the security video content having been performed at least in part wirelessly on a surveillance network over a wireless television channel dynamically selected by the base station from available wireless television channels associated with the premises,
      wherein the transceiver device of the dwelling unit monitors available television spectrum space at the premises, the available television spectrum space comprising unused channels, to determine a channel for wirelessly transmitting the security video content, where the channel is determined by the transceiver to have reduced interference with respect to other channels,
      wherein the transceiver device provides data indicating the wireless television channel to the base station, and
      wherein the transceiver device is connected with the digital video recorder;
      transmitting the security video content stored in the digital video recorder to a communication device that is remote from the premises and associated with an entity other than a dwelling unit;
      presenting the security video content at a display device associated with the digital video recorder, wherein the digital video recorder is provided with the security video content by the transceiver device in a first format for presentation at the display device and in a second format for transmission to the communication device; and
      delivering media content to the digital video recorder for presentation at the display device simultaneously with the security video content, wherein the media content is provided by a content network distinct from the surveillance network.

8. The storage device of claim 7, wherein the broadcast of the security video content is performed independently of interactive television services provided to the dwelling units.

9. The storage device of claim 7, wherein the security video content is converted, prior to receipt by the digital video recorder, to a format compatible with display devices of each of the dwelling units.

10. The storage device of claim 7, wherein the security video content is forwarded to another communication device, wherein the other communication device is a mobile device associated with a user of the digital video recorder, and wherein the mobile device is selected based on presence information.

11. The storage device of claim 7, wherein the operations further comprise performing video recognition on the security video content to determine an undesired condition associated with the premises, wherein the undesired condition includes unauthorized behavior, a probability of unauthorized activity, or presence of an unauthorized individual.

12. The storage device of claim 11, wherein the operations further comprise generating an alert message for display on the display device, wherein the alert message is generated when the undesired condition is recognized.

13. A method comprising:
receiving, at a base station, security video content associated with a premises having a plurality of display devices connected to a plurality of transceivers, the security video content having been captured by a camera located within or in proximity to the premises; and
multicasting the security video content from the base station to the display devices,
wherein the security video content is wirelessly multicast on a surveillance network over a wireless television channel dynamically selected by a transceiver of the plurality of transceivers from available wireless television channels associated with the premises,
wherein the transceiver monitors available television spectrum space at the premises, the available television spectrum space comprising unused channels, to determine a channel for wirelessly transmitting the security video content, where the channel is determined by the transceiver to have reduced interference with respect to other channels,
wherein the transceiver provides data indicating the wireless television channel to the base station,
presenting the security video content at the display devices,
wherein each of the plurality of transceivers provides the security video content in a first format for presentation at the corresponding display device and in a second format for transmission to a communication device outside the premises and associated with an entity other than a user of a display device at the premises; and
delivering media content for presentation at the display devices simultaneously with the security video content,
wherein the media content includes interactive television services and is provided by a content network distinct from the surveillance network, and
wherein the multicast of the security video content is performed independently of providing the interactive television services.

14. The method of claim 13, further comprising converting the security video content to a format compatible with the display devices after receipt and before multicasting to the display devices.

15. The method of claim 13, further comprising performing video recognition on the security video content to determine an undesired condition associated with the premises.

16. The method of claim 13, wherein the wireless multicast of the security video content is according to the 802.22 standard.

17. The method of claim 13, wherein the security video content is transmitted to another communication device, and wherein the other communication device is a mobile device associated with a user of a display device of the plurality of display devices.

18. The method of claim 17, wherein the mobile device is selected based on presence information.

19. The method of claim 13, further comprising generating a graphical user interface for presentation on a display device of the plurality of display devices, the graphical user interface occupying a portion of a screen of the display device and allowing presentation of media content on another portion of the screen.

20. The method of claim 19, wherein the graphical user interface comprises a toolbar that allows for controlling of the camera.

* * * * *